(12) United States Patent
Ward (10) Patent No.: US 9,973,286 B2
(45) Date of Patent: May 15, 2018

(54) SYSTEM AND METHOD FOR CANCELLING PHASE NOISE INDUCED BY ANTENNA VIBRATION

(71) Applicant: RAYTHEON COMPANY, Waltham, MA (US)

(72) Inventor: John Strawn Ward, Roanoke, IN (US)

(73) Assignee: RAYTHEON COMPANY, Waltham, MA (US)

( * ) Notice: Subject to any disclaimer, the term of this patent is extended or adjusted under 35 U.S.C. 154(b) by 0 days. days.

(21) Appl. No.: 15/273,207

(22) Filed: Sep. 22, 2016

(65) Prior Publication Data

US 2018/0083718 A1 Mar. 22, 2018

(51) Int. Cl.

| H04B 15/04 | (2006.01) |
|---|---|
| H04B 17/00 | (2015.01) |
| H04B 17/336 | (2015.01) |
| H01Q 1/12 | (2006.01) |
| H04B 17/21 | (2015.01) |
| H01Q 3/30 | (2006.01) |
| H01Q 1/00 | (2006.01) |

(52) U.S. Cl.
CPC .......... *H04B 15/04* (2013.01); *H04B 17/336* (2015.01); *H01Q 1/005* (2013.01); *H01Q 1/1242* (2013.01); *H01Q 3/30* (2013.01); *H04B 17/21* (2015.01)

(58) Field of Classification Search
CPC ........ H01Q 1/005; H01Q 1/1242; H01Q 3/30; H04B 17/21
See application file for complete search history.

(56) References Cited

U.S. PATENT DOCUMENTS

| 5,046,135 A | 9/1991 | Hatcher |
|---|---|---|
| 5,049,745 A | 9/1991 | Vogen et al. |
| 5,068,834 A | 11/1991 | Fromont |

(Continued)

FOREIGN PATENT DOCUMENTS

| CN | 101067657 A | 11/2007 |
|---|---|---|
| CN | 100501353 C | 6/2009 |
| WO | WO 2006/043952 A2 | 4/2006 |

OTHER PUBLICATIONS

Donovan, Joseph B. et al.; "Vibration-Induced Phase Noise in Signal Generation Hardware"; EFTF-IFCS 2009 Joint Conference; Besancon, France; Apr. 20, 2009; 62pp.

(Continued)

*Primary Examiner* — Ross Varndell
(74) *Attorney, Agent, or Firm* — Lewis Roca Rothgerber Christie LLP (57) ABSTRACT

System and method for correcting a phase noise generated by vibration of an antenna transmitting or receiving a radio frequency (RF) signal in a signal propagation direction includes: measuring the vibration of the antenna by a sensor generating an output signal; converting the output signal of the sensor to a measurement signal proportional to the vibration of the antenna in the signal propagation direction; performing a single or double integral of the measurement signal to produce a control signal with an amplitude proportional to the vibrational velocity or displacement of the antenna in the signal propagation direction; and applying the control signal to an oscillator, a clock signal, or a phase controller associated with the RF signal.

20 Claims, 4 Drawing Sheets

(56) References Cited

U.S. PATENT DOCUMENTS

| | | | |
|---|---|---|---|
| 5,163,176 A * | 11/1992 | Flumerfelt | G01S 7/2813 |
| | | | 342/174 |
| 5,245,347 A * | 9/1993 | Bonta | G01S 7/2813 |
| | | | 342/149 |
| 5,281,974 A | 1/1994 | Kuramoto et al. | |
| 5,369,348 A | 11/1994 | Gennesseaux | |
| 5,392,607 A | 2/1995 | Wu | |
| 5,777,573 A | 7/1998 | Klausing et al. | |
| 5,816,122 A | 10/1998 | Benning et al. | |
| 5,896,031 A | 4/1999 | King | |
| 5,999,129 A | 12/1999 | Rose | |
| 7,209,165 B2 | 4/2007 | Ishikawa | |
| 7,603,894 B2 | 10/2009 | Breed | |
| 7,948,633 B2 * | 5/2011 | Froggatt | G01M 11/083 |
| | | | 356/479 |
| 8,305,081 B2 | 11/2012 | Reiderman et al. | |
| 2010/0321234 A1 | 12/2010 | Goldman | |
| 2011/0070855 A1 | 3/2011 | Mariotti | |

OTHER PUBLICATIONS

Hati, A. et al.; "Vibration Sensitivity of Microwave Components" IEEE; 2007; pp. 541-546.
Hati, Archita et al.; "Vibration-induced PM Noise in Oscillators and its Suppression"; Chapter 13; Aerial Vehicles; Jan. 2009; pp. 259-286.

* cited by examiner

SYSTEM AND METHOD FOR CANCELLING PHASE NOISE INDUCED BY ANTENNA VIBRATION

FIELD OF THE INVENTION

The disclosed invention relates generally to electronic circuits and more specifically to systems and methods for the cancellation of phase noise induced by antenna vibration.

BACKGROUND

When an antenna vibrates, it induces phase noise on the signals that it transmits and receives. The physical displacement of an antenna in space caused by vibration induces phase errors on signals transmitted and received by the antenna. An alternate interpretation of this phase error is that acceleration induces time-varying Doppler shifts on the signals. This noise source is significant for microwave and millimeter-wave systems operating in high-vibration environments that require low phase noise at small frequency offsets. Moreover, when the vibrational displacement becomes significant compared to the carrier wavelength, nonlinear effects create phase noise spurs offset from the carrier frequency by integer multiples of the vibration frequencies, and vibration can suppress the power at the carrier frequency.

Some microwave and millimeter-wave wireless technologies operating on mobile platforms require low phase noise at small frequency offsets. Commercial off-the-shelf radio-frequency oscillators are available with g sensitivities down to as low as a few times $10^{-12}$ per g, where g is the acceleration of gravity near the earth's surface. At this level, the phase noise contribution from the vibration of the antenna will be larger than the phase noise contribution from the vibration of the oscillator at frequency offsets up to several kilohertz. For these systems, antenna vibration dominates the system phase noise. This vibration-induced phase noise degrades communications links, degrades clutter rejection for radars, interferes with radar Doppler velocity measurement of slow-moving objects, degrades synthetic aperture radar (SAR), and degrades navigation accuracy.

SUMMARY

In some embodiments, the disclosed invention is a system for correcting a phase noise generated by vibration of an antenna transmitting or receiving a radio frequency (RF) signal in a signal propagation direction. The system includes: one or more sensors for measuring the vibration of the antenna and generating an output signal; a projector for converting the output signal of the sensors to a measurement signal proportional to the vibration of the antenna in the signal propagation direction; and an integrator for performing an integral of the measurement signal to produce a control signal with an amplitude proportional to the vibrational velocity of the antenna in the signal propagation direction, wherein the control signal is applied to an oscillator or a clock signal associated with the RF signal.

In some embodiments, the RF signal may be a transmit signal where the output of the oscillator or a clock signal is used by a transmitter to set the output frequency of the transmitter, and the frequency of the oscillator or clock signal is controlled by the control signal.

In some embodiments, the RF signal is a receive signal where the output of an oscillator or a clock signal is used by a receiver to set a tune frequency of the receiver, and the frequency of the oscillator or clock signal is controlled by the control signal.

In some embodiments, the disclosed invention is a system for correcting phase noise generated by vibration of an antenna transmitting or receiving a radio frequency (RF) signal in a signal propagation direction. The system includes: one or more sensors for measuring the vibration of the antenna and generating an output signal; a projector for converting the output signal of the sensors to a measurement signal proportional to the vibration of the antenna in the signal propagation direction; and an integrator for performing a double integral of the measurement signal to produce a control signal with an amplitude proportional to a vibration displacement of the antenna in the signal propagation direction, wherein the control signal is applied to a phase controller associated with the RF signal to modify a phase of the RF signal.

In some embodiments, the RF signal may be a transmit signal where the phase noise is cancelled by adjusting a phase of the transmitted signal to cancel out a corresponding phase of the vibrational displacement of the antenna in the direction of signal propagation.

In some embodiments, the RF signal may be a receive signal where the phase noise is cancelled by adjusting a phase of the received signal to cancel out a corresponding phase of the vibrational displacement of the antenna in the direction of signal propagation.

In some embodiments, the disclosed invention is a method for correcting a phase noise generated by vibration of an antenna transmitting or receiving a radio frequency (RF) signal in a signal propagation direction. The method includes: measuring the vibration of the antenna by a sensor generating an output signal; converting the output signal of the sensor to a measurement signal proportional to the vibration of the antenna in the signal propagation direction; performing an integral of the measurement signal to produce a control signal with an amplitude proportional to the vibrational velocity of the antenna in the signal propagation direction; and applying the control signal to an oscillator or a clock signal associated with the RF signal.

In some embodiments, the disclosed invention is a method for correcting a phase noise generated by vibration of an antenna transmitting or receiving a radio frequency (RF) signal in a signal propagation direction. The method includes: measuring the vibration of the antenna by a sensor generating an output signal; converting the output signal of the sensor to a measurement signal proportional to the vibration of the antenna in the signal propagation direction; performing a double integral of the measurement signal to produce a control signal with an amplitude proportional to a vibrational displacement of the antenna in the signal propagation direction; and applying the control signal to a phase controller associated with the RF signal to modify a phase of the RF signal.

The converting, performing a single or double integral, and applying may be performed in an analog or digital domain.

BRIEF DESCRIPTION OF THE DRAWINGS

These and other features, aspects, and advantages of the disclosed invention will become better understood with regard to the following description, appended claims, and accompanying drawings.

DETAILED DESCRIPTION

In some embodiments, the disclosed invention measures antenna vibration and uses such measurement to cancel vibration-induced phase noise in real time while an antenna system is being used. The disclosed invention mitigates phase noise induced by vibration of antennas by cancelling a significant portion of the induced phase noise. The invention may be used for both transmit and receive signals and is capable of performing the cancellation both in the frequency domain and in the phase domain.

In some embodiments, the disclosed invention measures acceleration of an antenna by sensors, for example accelerometers, and uses the measured acceleration to compute the portion of the phase noise caused by antenna vibration and then cancels the phase noise, independent of the characteristics and usage of the transmitted and received signals, as long as the direction of propagation is known. For example, the disclosed invention is suitable for transmitting or receiving communications signals, radar signals, and electronic attack signals. The direction of propagation is typically known for a radar system. For non-radar, applications, the direction of propagation may be obtained by various known methods. For example, if the locations of the transmitter and the receivers are obtained, for instance by use of a GPS system, the direction of propagation can be easily obtained from the two locations.

In some embodiments, the disclosed invention cancels phase noise induced by antenna vibration in a way that is independent of the type of vibration, cancelling both random and non-random vibration with any power spectral density (PSD).

Figure 1A:
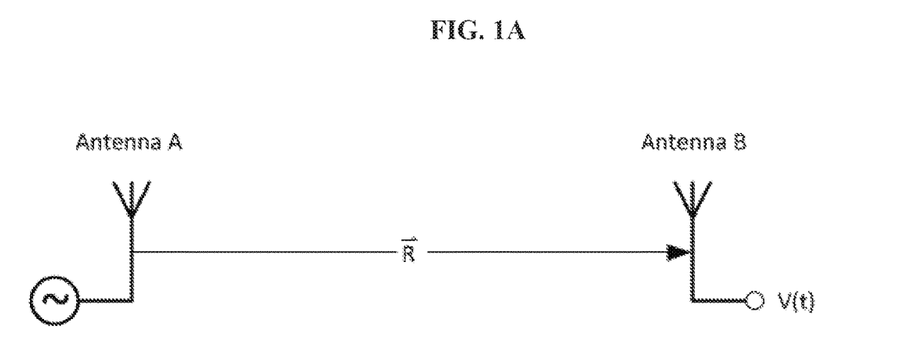
FIG. 1A schematically illustrates the vibration of a first antenna that induces phase noise on a signal received by a second antenna.

FIG. 1A schematically illustrates vibration-induced phase noise. As shown, antenna B is receiving a signal transmitted by antenna A. Vibration of either antenna causes the distance separating the antennas R to change with time. This changing separation induces phase errors on the signal. An equivalent picture is that vibrational velocities induce time-varying Doppler frequency shifts on the signal.

Figure 1B:
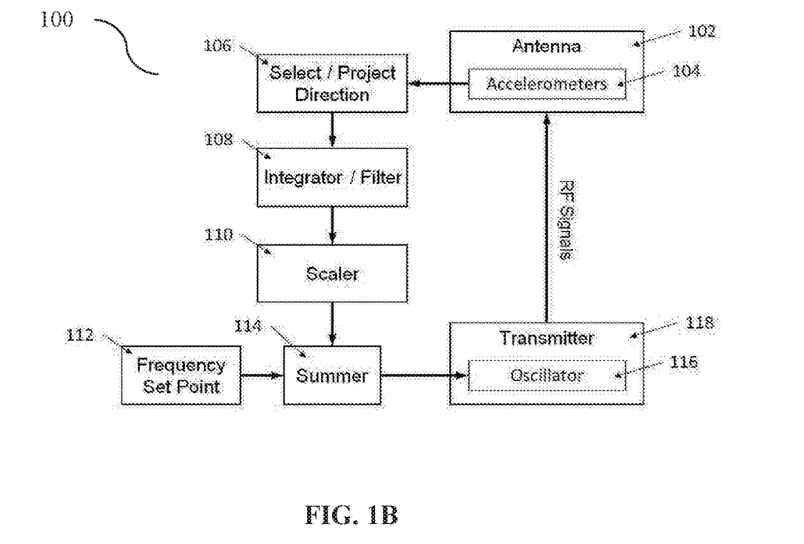
FIG. 1B is a simplified exemplary block diagram of a frequency-domain canceller for a transmit signal, according to some embodiments of the disclosed invention.

FIG. 1B is a simplified exemplary block diagram of a frequency-domain canceller 100 for a transmit signal, according to some embodiments of the disclosed invention. As shown, a transmitter 118 generates a signal, for example a radio frequency (RF) signal, for transmission/radiation by an antenna 102. One or more accelerometers 104 measure the vibrational acceleration of the antenna 102. Accelerometers that measure vibrations/accelerations are well known in the art. The antenna 102 may be any type and technology, such as omnidirectional antenna, high-gain antenna, phased-array antenna, active electronically scanned array (AESA), or any other type of antenna.

An optional projector 106 converts the accelerometer outputs to a signal proportional to the antenna acceleration in a direction parallel to the direction of propagation of the RF signal since vibration orthogonal to the direction of propagation does not contribute phase noise. This may be accomplished by selecting an accelerometer the axis of which is aligned with the direction of the RF signal propagation, or by, for example, computing the dot product of a vector in the direction of propagation with a measured acceleration vector. Gravitational acceleration of 9.81 m/s$^2$ downward may be subtracted by the projector to prevent the canceller from inducing frequency drift on the transmitted signal.

An integrator/filter circuit 108 computes the integral of the measured acceleration over time to generate a control signal with amplitude that is proportional to the antenna's vibrational Doppler velocity ($v = \int \alpha \, dt$), which is in turn proportional to the Doppler frequency shift. In some embodiments, the integrator/filter circuit 108 also filters out high-vibrational-frequency noise and low-vibrational-frequency drift from the accelerometer, such as residual acceleration from imperfect subtraction of gravitational acceleration and non-vibrational acceleration of the platform, for example, steering or turning a radar platform.

An optional scaler 110 adjusts the amplitude of the control signal to optimally cancel the vibration-induced phase noise, matching the accelerometer sensitivity to the oscillator sensitivity for optimum cancellation. For systems working in the digital domain, the scalar is typically a multiplication, whereas for analog systems the scaler is typically implemented as a fixed amplifier gain or resistive loss. The scaler multiplication factor (gain) can be calculated from the accelerometer sensitivity and the oscillator control sensitivity, and may be fine-tuned experimentally for optimum cancellation by adjusting the scaler gain while measuring the phase noise of an antenna under vibration.

A frequency set point control signal 112 sets an oscillator's nominal frequency before the phase noise correction is applied. The value of the control signal 112 may be part of the transmitter architecture, and would typically be the set point for the oscillator 116 that would have been used had the canceller not been installed. A summer 114 combines the set point control signal 112 and the output of the scaler 110 to produce an oscillator set point including the phase noise correction. An oscillator or clock 116 generates a signal the frequency of which is controlled by the output of the summer. This output signal of the oscillator is used by a transmitter 118 to generate an RF signal for transmission/radiation by the antenna 102. The frequency of this RF signal is controlled by the frequency of the oscillator 116. For example, the oscillator 116 may be the transmitter's reference oscillator, a numerically controlled oscillator in a digital frequency converter, the clock for a digital-to-analog converter (DAC), or a local oscillator in a heterodyne frequency converter, as part of a transceiver system. This system cancels phase noise by adjusting the transmit frequency to cancel out the time-varying Doppler frequency changes induced by vibrational acceleration.

Figure 2:
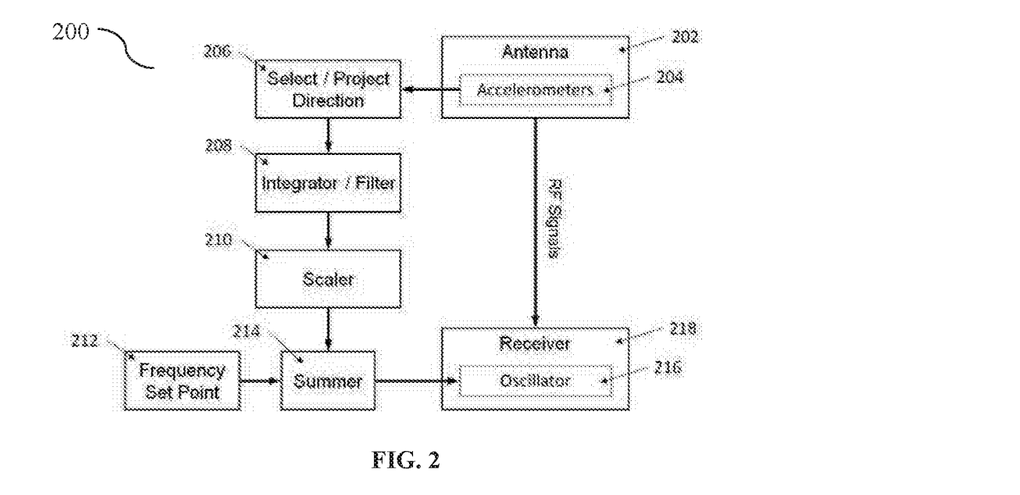
FIG. 2 is a simplified exemplary block diagram of a frequency-domain canceller for a receive signal, according to some embodiments of the disclosed invention.

FIG. 2 is a simplified exemplary block diagram of a frequency-domain canceller 200 for a receive signal, according to some embodiments of the disclosed invention. As depicted, a receiver 218 receives an RF signal from a vibrating antenna 202. One or more accelerometers measure the vibrational acceleration of the antenna 202. The antenna 202 may be any type and technology, such as omnidirectional antenna, high-gain antenna, phased-array antenna, active electronically scanned array (AESA), or any other type of antenna. An optional projector 206 converts the accelerometer outputs to a signal proportional to the antenna acceleration in a direction parallel to the RF link direction of propagation. This may be accomplished by selecting an accelerometer the axis of which is aligned with the direction of propagation, or by projection, for example, computing the dot product of a vector in the direction of propagation with a measured acceleration vector. Gravitational acceleration of 9.81 m/s² downward may be subtracted by the projector to prevent the canceller from inducing frequency drift on the received signal.

An integrator/filter circuit 208 computes the integral of the measured acceleration to generate a control signal with amplitude that is proportional to the antenna's vibrational Doppler velocity. In some embodiments, the integrator/filter circuit 208 or a filter filters out high vibrational frequency noise and low vibrational frequency drift from the accelerometer, such as residual acceleration from imperfect subtraction of gravitational acceleration. An optional scaler 210 adjusts the amplitude of the control signal to optimally cancel the vibration-induced phase noise.

A frequency set point control signal 212 sets an oscillator's nominal frequency before the phase noise correction is applied to the received RF signal. The value of the control signal 212 may be part of the receiver architecture, which is applied to the canceller 200 as an input, and would typically be the set point for the oscillator 216 that would have been used had the canceller not been installed. A summer 214 combines the control signal 212 and the output of the scaler 210 to produce an oscillator set point including the phase noise correction. An oscillator 216 generates a signal the frequency of which is controlled by the output of the summer. This output signal of the oscillator is used by a receiver 218 to set the tune frequency of the receiver. The receiver's tune frequency is controlled by the frequency of the oscillator 216. The oscillator or clock 216 may be the receiver's reference oscillator, a numerically controlled oscillator in a digital frequency converter, the clock for an analog-to-digital converter (ADC), or a local oscillator in a heterodyne frequency converter, as part of the a transceiver system. This system cancels phase noise by adjusting the receiver tune frequency to cancel out the time-varying Doppler frequency changes induced by vibrational acceleration.

One skilled in the art would recognize that the functions of the circuits in FIGS. 1B and 2 can be performed in the analog domain by analog components/circuits or in the digital domain by digital components/circuits. For example, if the accelerometers are digital, then the projector, integrator and the summer may be implemented with digital circuits to perform the functions in the digital domain. Conversely, if the accelerometers are analog, then the projector, integrator and the summer may be implemented with analog circuits to perform the functions in the analog domain. Analog signals can be digitized at any point in the signal path from the accelerometer to the oscillator.

Figure 3:
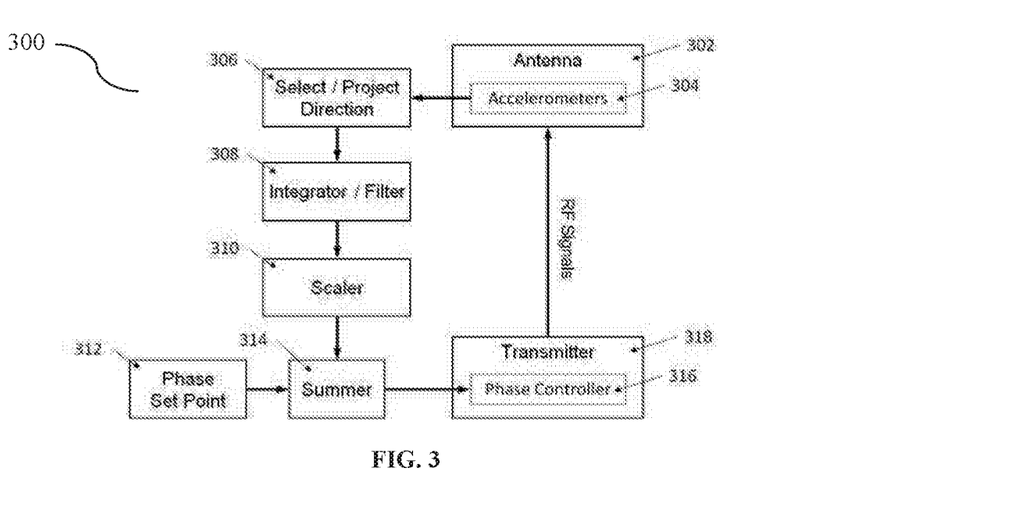
FIG. 3 is a simplified exemplary block diagram of a phase-domain canceller for a transmit signal, according to some embodiments of the disclosed invention.

FIG. 3 is a simplified exemplary block diagram of a phase-domain canceller 300 for a transmit signal, according to some embodiments of the disclosed invention. As shown, a transmitter 318 generates a signal, for example a radio frequency (RF) signal, for transmission/radiation by an antenna 302. One or more accelerometers 304 measure the vibrational acceleration of the antenna 302. An optional projector 306 converts the accelerometer outputs to a signal proportional to the antenna acceleration in a direction parallel to the RF link direction of propagation. Again, this may be accomplished by selecting an accelerometer the axis of which is aligned with the direction of propagation, or by projection, for example, computing the dot product of a vector in the direction of propagation with a measured acceleration vector. Gravitational acceleration of 9.81 m/s² downward may be subtracted by the projector to prevent the canceller from inducing frequency drift on the transmitted signal.

An integrator/filter circuit 308 computes the double integral of the measured acceleration to generate a control signal with amplitude that is proportional to the antenna's vibrational displacement in the direction of propagation. This is because acceleration is the second derivative of the displacement with respect to time, $a=d^2x/dt^2$. In some embodiments, the integrator/filter circuit 308 or a filter filters out high vibrational frequency noise and/or low vibrational frequency drift from the accelerometer, such as residual acceleration from imperfect subtraction of gravitational acceleration. An optional scaler 310 adjusts the amplitude of the control signal to optimally cancel the vibration-induced phase noise. The scaler multiplication factor (gain) can be calculated from the accelerometer sensitivity and phase controller sensitivity, and may be fine-tuned experimentally for optimum cancellation by adjusting the scaler gain while measuring the phase noise of an antenna under vibration.

An optional phase set point control signal 312 sets a nominal phase before the phase noise correction is applied to the transmit RF signal. The value for the nominal phase depends on the architecture of the system and its requirements. For example, the system might apply phase-shift keying (PSK) modulation at the same control point as the phase noise correction, so the PSK phase shift is summed with the correction in the summer. The value of the phase set point control signal 312 may be part of the transmitter architecture, which is provided to the canceller 300 as an input. For example, the control signal 312 could be the phase shifts applied for PSK modulation.

In the embodiments for which an optional phase set point control signal 312 is used, a summer 314 combines the control signal 312 and the output of the scaler 310 to produce the phase set point including the phase noise correction. A phase controller 316 modifies the transmitted signal's phase as controlled by the output of the summer 314. If the optional phase set point 312 and summer 314 are not used, then the scaler 310 output is directly connected to the phase controller 316 input. The phase controller 316 may be any known phase shifter type (analog or digital), such as an analog voltage-controlled phase shifter, a phase offset control word input to a direct digital synthesizer (DDS), or a phase control input to a numerically controlled oscillator (NCO). The phase controller 316 can adjust the phase in baseband, at an intermediate frequency (IF), or at the radio frequency (RF). This system cancels phase noise by adjusting the phase of the transmitted signal to cancel out the corresponding phase of the vibrational displacement of the antenna in the direction of propagation. For example, if the transmitted wavelength is 40 mm and the vibrational displacement in the direction of propagation is 5 mm, then the phase correction would be 360°×(5 mm/40 mm)=45°.

Figure 4:
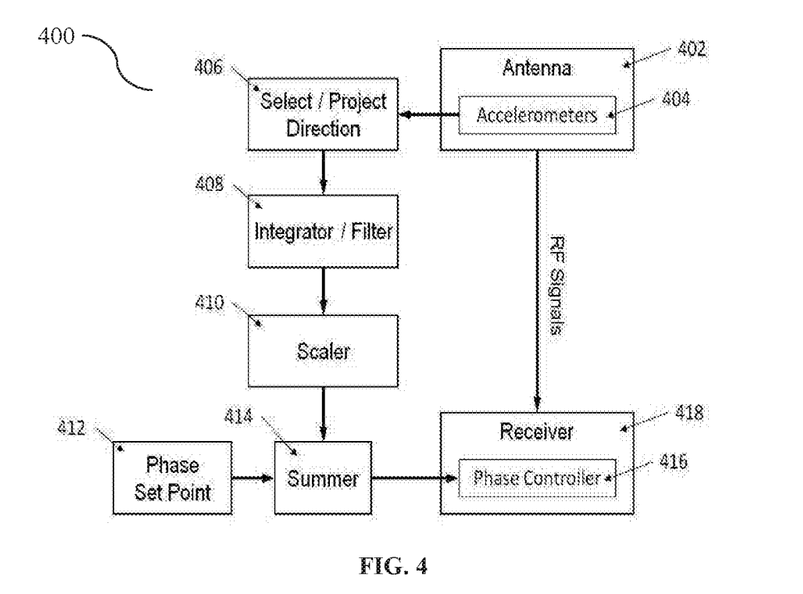
FIG. 4 is a simplified exemplary block diagram of a phase-domain canceller for a receive signal, according to some embodiments of the disclosed invention.

FIG. 4 is a simplified exemplary block diagram of a phase-domain canceller 400 for a receiver, according to some embodiments of the disclosed invention. As shown, a receiver 418 receives a radio frequency (RF) signal from a vibrating antenna 402. One or more accelerometers 404 measure the vibrational acceleration of the antenna 402. An optional projector 406 converts the accelerometer outputs to a signal proportional to the antenna acceleration in a direction parallel to the RF link direction of propagation. This may be accomplished by selecting an accelerometer the axis of which is aligned with the direction of propagation, or by projection, for example, computing the dot product of a vector in the direction of propagation with a measured acceleration vector. Gravitational acceleration of 9.81 m/s$^2$ downward may be subtracted by the projector to prevent the canceller from inducing frequency drift on the received signal.

An integrator/filter circuit 408 computes the double integral of the measured acceleration to generate a control signal with amplitude that is proportional to the antenna's vibrational displacement in the direction of propagation. This is because acceleration is the second derivative of the displacement with respect to time, $a=d^2x/dt^2$. In some embodiments, the integrator/filter circuit 408 or a filter filters out high vibrational frequency noise and/or low vibrational frequency drift from the accelerometer, such as residual acceleration from imperfect subtraction of gravitational acceleration. A scaler 410 adjusts the amplitude of the control signal to optimally cancel the vibration-induced phase noise.

An optional phase set point control signal 412 sets a nominal phase before the phase noise correction is applied to the received signal. The value of the control signal 412 may be part of the receiver architecture, which is applied to the canceller 400 as an input. In the embodiments for which an optional phase set point control signal 412 is used, a summer 414 combines the control signal 412 and the output of the scaler 410 to produce the receiver's set point including phase noise correction. A phase controller 416 modifies the phase of the receiver's demodulated output as controlled by the output of the summer 414. If the optional phase set point 412 and summer 414 are not used, then the scaler 410 output would connect directly to the phase controller 416 input. The phase controller 416 may be any known phase shifter type (analog or digital), such as an analog voltage-controlled phase shifter, a phase offset control word input to a direct digital synthesizer (DDS), or a phase control input to a numerically controlled oscillator (NCO). The phase controller 416 can adjust the phase in baseband, at an intermediate frequency, or at the radio frequency (RF). This system cancels phase noise by adjusting the phase of the receive signal to cancel out the corresponding phase of the vibrational displacement of the antenna in the direction of propagation. For example, if the received wavelength is 40 mm and the vibrational displacement in the direction of propagation is 5 mm, then the phase correction would be 360°×(5 mm/40 mm)=45°.

One skilled in the art would recognize that the functions of the circuits in FIGS. 3 and 4 can be performed in the analog domain by analog components/circuits or in the digital domain by digital components/circuits. For example, if the accelerometers are digital, then the projector, integrator and the summer may be implemented with digital circuits to perform the functions in the digital domain. Conversely, if the accelerometers are analog, then the projector, integrator and the summer may be implemented with analog circuits to perform the functions in the analog domain. Analog signals can be digitized at any point in the signal path from the accelerometer to the oscillator.

Figure 5:
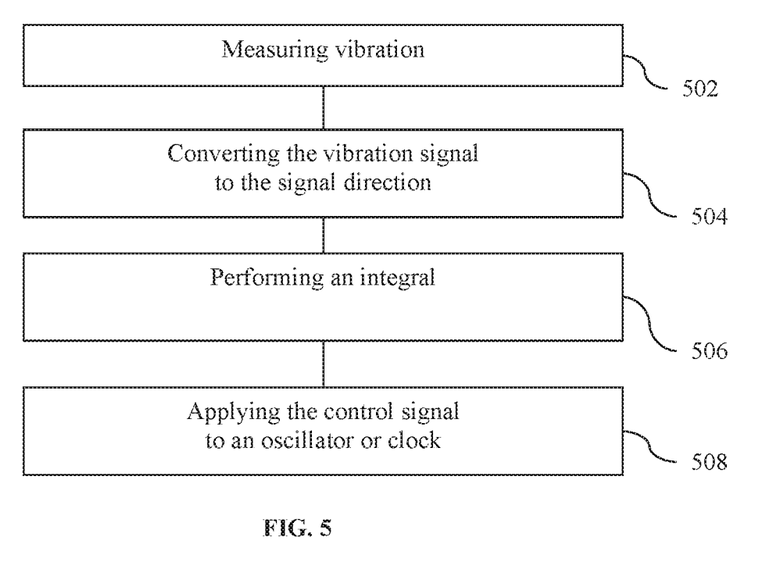
FIG. 5 is a simplified exemplary process flow diagram for cancelling vibration-induced phase noise with a frequency correction, according to some embodiments of the disclosed invention.

FIG. 5 is a simplified exemplary process flow diagram for cancelling vibration-induced phase noise with a frequency correction, according to some embodiments of the disclosed invention. In some embodiments, FIG. 5 depicts a method for correcting phase noise generated by vibration of an antenna transmitting or receiving an RF signal that has a signal propagation direction, by using frequency-domain cancellation. As shown in block 502, the vibration of the antenna is measured by one or more sensors, such as one or more accelerometers. In block 504, the output signal(s) of the sensor(s) are converted to measurement signal(s) proportional to the vibration of the antenna in the signal propagation direction. In block 506, an integral of the measured signal is performed to produce a control signal with an amplitude proportional to the vibrational velocity of the antenna in the signal propagation direction. The control signal may optionally be scaled and optionally summed with a frequency set point (shown in FIGS. 1B and 2) to better match the sensitivity of an oscillator or a clock signal. In block 508, the control signal is applied to an oscillator or clock signal associated with the RF signal.

In the case of the RF signal being a transmit signal, the oscillator or a clock generates a signal the frequency of which is controlled by the control signal. The output of the oscillator (or clock) is used by a transmitter to generate the RF signal for transmission/radiation by the antenna. The frequency of this RF signal is controlled by the frequency of the oscillator. The oscillator may be the transmitter's reference oscillator, a numerically controlled oscillator in a digital frequency converter, the clock for a digital-to-analog converter (DAC), or a local oscillator in a heterodyne frequency converter, as part of a transceiver system. This way, the phase noise is cancelled by adjusting the transmit frequency to cancel out the time-varying Doppler frequency changes induced by vibrational acceleration.

In the case of the RF signal being a receive signal, the output signal of the oscillator (or the clock) is used by a receiver to set the tune frequency of the receiver. The receiver's tune frequency is controlled by the frequency of the oscillator (or the clock). The oscillator or clock may be the receiver's reference oscillator, a numerically controlled oscillator in a digital frequency converter, the clock for an analog-to-digital converter (ADC), or a local oscillator in a heterodyne frequency converter, as part of the a transceiver system. In this manner, the phase noise is cancelled by adjusting the receiver tune frequency to cancel out the time-varying Doppler frequency changes induced by vibrational acceleration.

Figure 6:
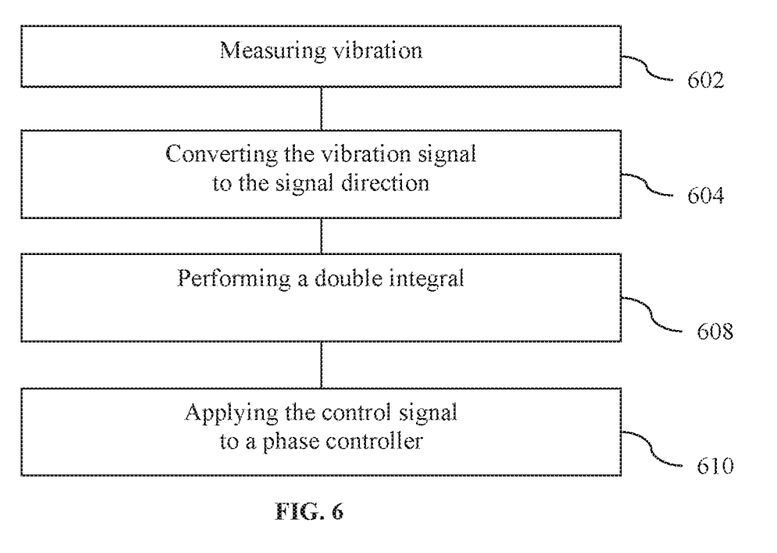
FIG. 6 is a simplified exemplary process flow diagram for cancelling vibration-induced phase noise with a phase correction, according to some embodiments of the disclosed invention.

FIG. 6 is a simplified exemplary process flow diagram for cancelling vibration-induced phase noise with a phase-domain correction, according to some embodiments of the disclosed invention. In some embodiments, FIG. 6 depicts a method for correcting phase noise generated by vibration of an antenna transmitting or receiving an RF signal that has a signal propagation direction, by using phase-domain cancellation. As shown in block 602, the vibration of the antenna is measured by one or more sensors, such as one or more accelerometers. In block 604, the output signal(s) of the sensor(s) are converted to measurement signal(s) proportional to the vibration of the antenna in the signal propagation direction. In block 606, a double integral of the measurement signal is performed to produce a control signal with an amplitude proportional to the vibration displacement of the antenna in the signal propagation direction. The control signal may optionally be scaled and optionally summed with a phase set point (shown in FIGS. 3 and 4). In block 608, the control signal is applied to a phase controller associated with the RF signal to modify a phase of the RF signal. The phase controller can adjust the phase in baseband, at an intermediate frequency (IF), or at the radio frequency (RF). The phase noise is cancelled by adjusting the phase of the signal to cancel out the corresponding phase of the vibrational displacement of the antenna in the direction of signal propagation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

What is claimed is:

1. A system for correcting a phase noise generated by vibration of an antenna transmitting or receiving a radio frequency (RF) signal in a signal propagation direction comprising:
   one or more sensors for measuring the vibration of the antenna and generating an output signal;
   a projector for converting the output signal of the sensors to a measurement signal proportional to acceleration of the vibration of the antenna in the signal propagation direction; and
   an integrator for performing a single integral of the measurement signal to produce a control signal with an amplitude proportional vibrational Doppler velocity of the antenna in the signal propagation direction, wherein the control signal is applied, as a frequency compensation, to an oscillator or a clock signal associated with the RF signal.

2. The system of claim 1, further comprising a filter for filtering out high vibrational frequency noise and/or low vibrational frequency drift from the measured vibration.

3. The system of claim 1, wherein the RF signal is a transmit signal, and wherein the output of the oscillator or a clock signal is used by a transmitter to set the output frequency of the transmitter, and a frequency of the oscillator or clock signal is controlled by the control signal.

4. The system of claim 1, wherein the RF signal is a receive signal, and wherein the output of an oscillator or a clock signal is used by a receiver to set a tune frequency of the receiver, and the frequency of the oscillator or clock signal is controlled by the control signal.

5. The system of claim 1, further comprising a scaler for adjusting the amplitude of the control signal to match a sensitivity of the sensors to a sensitivity of the oscillator or the clock for optimum phase noise cancellation.

6. The system of claim 1, further comprising a summer for combining a set point control signal and an output of a scaler to produce an oscillator or clock set point including the phase noise correction.

7. The system of claim 1, wherein the sensors generate digital signals as output, and wherein the projector and the integrator are digital circuits.

8. The system of claim 1, wherein the sensors generate analog signals as output, and wherein the projector and the integrator are analog or digital circuits.

9. A system for correcting phase noise generated by vibration of an antenna for transmission of a radio frequency (RF) signal in a signal propagation direction comprising:
   one or more sensors for measuring the vibration of the antenna and generating an output signal;
   a projector for converting the output signal of the sensors to a measurement signal proportional to acceleration of the vibration of the antenna in the signal propagation direction;
   an integrator for performing a double integral of the measurement signal to produce a control signal with an amplitude proportional to a vibration displacement of the antenna in the signal propagation direction;
   a circuit for applying the control signal to a phase controller associated with the RF signal to modify a phase of the RF signal to generate a modified RF signal for transmission; and
   a transmitter for transmitting the modified RF signal by the antenna.

10. The system of claim 9, further comprising a filter for filtering out high vibrational frequency noise and/or low vibrational frequency drift from the measured vibration.

11. The system of claim 9, wherein the RF signal is a transmit signal, and wherein the phase noise is cancelled by adjusting a phase of the transmitted signal to cancel out a corresponding phase of the vibrational displacement of the antenna in the direction of signal propagation.

12. The system of claim 9, wherein the RF signal is a receive signal, and wherein the phase noise is cancelled by adjusting a phase of the received signal to cancel out a corresponding phase of the vibrational displacement of the antenna in the direction of signal propagation.

13. The system of claim 9, further comprising a scaler for adjusting the amplitude of the control signal to match a sensitivity of the sensors to a sensitivity of the phase controller for optimum phase noise cancellation.

14. The system of claim 9, further comprising a summer for combining a set point control signal and an output of a scaler to produce a set point for a phase controller including the phase noise correction.

15. The system of claim 9, wherein the sensors generate digital signals as output, and wherein the projector and the integrator are digital circuits.

16. The system of claim 9, wherein the sensors generate analog signals as output, and wherein the projector and the integrator are analog or digital circuits.

17. A method for correcting a phase noise generated by vibration of an antenna transmitting or receiving a radio frequency (RF) signal in a signal propagation direction, the method comprising:
   measuring the vibration of the antenna by a sensor generating an output signal;
   converting the output signal of the sensor to a measurement signal proportional to acceleration of the vibration of the antenna in the signal propagation direction;
   performing a single integral of the measurement signal to produce a control signal with an amplitude proportional to vibrational Doppler velocity of the antenna in the signal propagation direction; and
   applying the control signal, as a frequency compensation, to an oscillator or a clock signal associated with the RF signal.

18. The method of claim 17, wherein said converting, performing an integral, and applying are performed in an analog domain or in a digital.

19. A method for correcting a phase noise generated by vibration of an antenna for transmission of a radio frequency (RF) signal in a signal propagation direction, the method comprising:

measuring the vibration of the antenna by a sensor generating an output signal;

converting the output signal of the sensor to a measurement signal proportional to acceleration the vibration of the antenna in the signal propagation direction;

performing a double integral of the measurement signal to produce a control signal with an amplitude proportional to a vibrational displacement of the antenna in the signal propagation direction; and applying the control signal to a phase controller associated with the RF signal to modify a phase of the RF signal to generate a modified RF signal for transmission; and transmitting the modified RF signal by the antenna.

20. The method of claim 19, wherein said converting, performing a double integral, and applying are performed in an analog or digital domain.

* * * * *